(12) United States Patent
VijayaRaghavan et al.

(10) Patent No.: US 10,805,782 B1
(45) Date of Patent: Oct. 13, 2020

(54) HYBRID BLUETOOTH LOW ENERGY MESH NETWORKS HAVING PROXY DEVICES

(71) Applicant: Amazon Technologies, Inc., Seattle, WA (US)

(72) Inventors: VenkatRaghavan VijayaRaghavan, Cupertino, CA (US); Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/439,177

(22) Filed: Jun. 12, 2019

(51) Int. Cl.
*H04B 7/00* (2006.01)
*H04W 4/80* (2018.01)
*H04W 84/18* (2009.01)

(52) U.S. Cl.
CPC .............. *H04W 4/80* (2018.02); *H04W 84/18* (2013.01)

(58) Field of Classification Search
CPC ...... H04W 4/80; H04W 84/00; H04M 1/7253
See application file for complete search history.

(56) References Cited

U.S. PATENT DOCUMENTS

2018/0316446 A1* 11/2018 Nie .................... H04B 17/318
2019/0289487 A1* 9/2019 Hulvey ............... H04W 40/244

* cited by examiner

Primary Examiner — Tuan Pham
(74) Attorney, Agent, or Firm — Eversheds Sutherland (US) LLP

(57) ABSTRACT

Systems, methods, and computer-readable media are disclosed for systems and methods for hybrid Bluetooth Low Energy mesh networks. Example devices may include an antenna, memory configured to store computer-executable instructions, and at least one computer processor configured to access the memory and execute the computer-executable instructions to send a message, at a first time using the antenna, to a plurality of devices in a Bluetooth Low Energy (BLE) mesh group, the plurality of devices including a first device and a second device, wherein the first device is a first proxy device, receive a first acknowledgment message from the first device at a second time, and receive a second acknowledgment message from the first device at a third time, wherein the second acknowledgment message is sent to the first device by the second device.

19 Claims, 6 Drawing Sheets

US 10,805,782 B1

HYBRID BLUETOOTH LOW ENERGY MESH NETWORKS HAVING PROXY DEVICES

BACKGROUND

Certain devices may communicate using mesh networks. Mesh networks may allow for efficient data routing between devices by enabling nodes to connect directly and non-hierarchically to communicate in cooperation with other nodes. However, mesh networks may have different protocols and/or specifications. For example, some mesh networks may include specifications that dictate an amount of time a certain device in a network has to spend in a receiving mode, or listening for data. In one example, a mesh network specification may require certain devices to spend a significant amount of time, such as about 90% of airtime, scanning or receiving data from nodes. Such requirements may be difficult to achieve with certain device and/or hardware. Accordingly, hybrid mesh networks may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
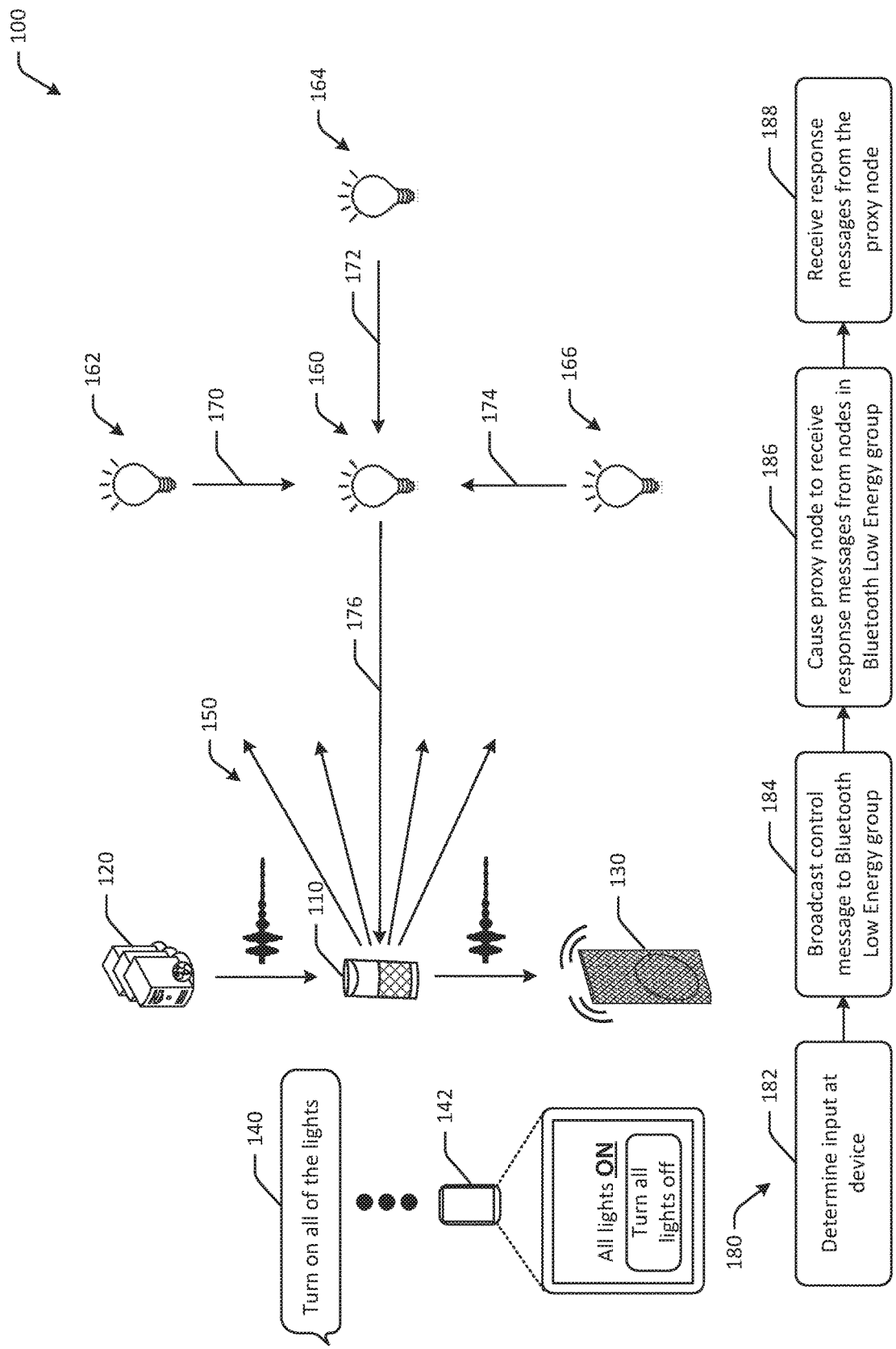
FIG. 1 is a schematic illustration of an example use case for hybrid Bluetooth Low Energy mesh networks having proxy devices in accordance with one or more example embodiments of the disclosure.

Mesh networks may be a type of wireless network topology, where each node in a mesh network participates in the distribution of data across the network, such as by relaying data to other nodes that are in range. Bluetooth Low Energy mesh networks may enable one-to-many or many-to-many device communications. Bluetooth Low Energy mesh networks may use multicast messages for various purposes, such as sending requests to devices in the mesh network. For example, a single light switch in a building may be used to control tens or hundreds of lights. Bluetooth Low Energy mesh networks may implement a managed flood messaging approach in combination with a publish/subscribe group messaging model to send and/or receive data amongst nodes. For example, a light switch may publish a "turn on" message to a "hallway group", and all lights along that hallway may be subscribed to that same "hallway group" address. The lights along the hallway may also be subscribed to other groups, such as the "ground floor group", the "all lights group", and the "emergency exit route" group. Nonetheless, a single device may publish or send a multicast message to many devices, where the message may include instructions, requests, or other data.

In response to multicast messages, a control device may receive individual unicast messages responsive to the multicast message. For example, each of the lights along the hallway may send a response message, such as a confirmation or acknowledgment message, to the light switch device. In order to receive the unicast messages directed to the light switch, mesh network specifications may include certain scanning or receiving mode time requirements. For example, Bluetooth Low Energy mesh network specifications may mandate that nodes participating in the mesh network need to be scanning 90% of the time, in order to receive all mesh packets. Accordingly, certain hardware at a device may be impacted. For example, a Bluetooth radio at a device may need to be scanning for advertisements 90% of the time. However, scanning time of 90% may not be feasible in instances where device limitations or device functionality may be impacted. For example, certain devices may use shared antenna(s) for WiFi and Bluetooth communication. When communicating over WiFi and Bluetooth connections, scanning for mesh packets for 90% of the time may impact device performance or prevent the device from communicating over the other WiFi and Bluetooth connections. As an alternative, a generic attribute profile proxy may be used to send and receive packets over a mesh network, however, this alternative may introduce a popcorn effect in a start based node arrangement although the network is mesh capable. The popcorn effect is discussed in detail with respect to FIG. 3.

Embodiments of the disclosure include systems and methods for hybrid Bluetooth Low Energy mesh networks. Certain embodiments may bypass scan time limitations on devices by using one or more generic attribute profile devices to receive unicast messages acting as a generic attribute profile bearer, and sending or broadcasting messages via the device itself, acting as an advertising bearer. Although in some embodiments, a response from a proxy node (e.g., the generic attribute profile bearer) would be received at different times, such lags or latency may not impact time sensitive data packet or otherwise negatively impact a user experience.

Bluetooth Low Energy is a communication protocol that may allow devices to communicate without a network connection. Devices may have profiles that define the manner in which other devices may communicate with the device. Bluetooth devices may include attribute tables, such as a generic attribute profile that may include services, characteristics, and/or descriptors. Services may include one or more characteristics. Characteristics may be data that relates to a particular internal state of the device, such as a current battery level, or may include customized information. In some embodiments, characteristics may be used to communicate data payloads amongst nodes in a mesh network.

This disclosure relates to, among other things, devices, systems, methods, computer-readable media, techniques, and methodologies for hybrid Bluetooth Low Energy mesh networks. Certain embodiments include user devices and/or remote servers configured to learn mesh networks, select optimal proxy nodes, determine a number of proxy nodes needed to cover a network, broadcast messages, and/or designate proxy nodes to receive unicast packets intended for a device.

Referring to FIG. 1, an example use case 100 for hybrid Bluetooth Low Energy mesh networks having proxy devices is depicted in accordance with one or more example embodiments of the disclosure. In FIG. 1, a user device 110 may be in communication with a remote server 120 and a speaker device 130. The user device 110 may include a microphone configured to receive voice input. In some embodiments, the user device 110 may be a displayless voice-controlled device, and may include an antenna that is configured to transmit and receive data using at least two of a WiFi protocol, a Bluetooth protocol, and a Bluetooth Low Energy protocol. For example, the user device 110 may include an antenna that is shared between both WiFi and Bluetooth communications. Accordingly, the user device 110 may not have a separate Bluetooth Low Energy chip or radio in some embodiments.

In FIG. 1, the user device 110 may be used to stream audio content to the speaker device 130. For example, the user device 110 may be connected to the remote server 120 over a WiFi connection. The user device 110 download audio data from the remote server 120 over the WiFi connection. The user device 110 may then send the audio data to the speaker device 130 over a Bluetooth connection. For example, the speaker device 130 may be connected to the user device 110 using a Bluetooth connection, and may be used by a user to playback streamed audio content. In other instances, the user device may receive Bluetooth data from another device, such as a smartphone, and may distributed the data as an audio distribution master in a whole home audio group. For example, a user may playback content from a smartphone to multiple speaker devices in an environment. WiFi and Bluetooth communications may be split into equal 30 millisecond super-frames. Bluetooth Low Energy scans may not be allowed during the WiFi super-frame, and may be scheduled as lower priority than other Bluetooth traffic during the Bluetooth super-frame. Accordingly, the maximum airtime for Bluetooth Low Energy scans in the illustrated use case (e.g., WiFi reception and Bluetooth streaming, etc.) is about 20%. For a whole home audio use case, the maximum airtime for Bluetooth Low Energy scans may be about 0%, due to prioritization. Whole home audio may be further problematic because an audio destination device may have no notion of the slot which a data packet will arrive, so the receive window must be opened long enough to receive the transmission.

The user device 110 may be part of a Bluetooth Low Energy mesh network that includes a number of lightbulbs. The user device 110 may be configured to control operation of, or otherwise communicate with, the lightbulbs based at least in part on user input. The lightbulbs may be nodes in the Bluetooth Low Energy mesh network, or in a particular Bluetooth Low Energy mesh group. The user device 110 may communicate with the nodes using Bluetooth Low Energy.

To implement a hybrid Bluetooth Low Energy mesh network having proxy devices, the user device 110 and/or one or more remote servers, may implement a process flow 180. At a first block 182, the user device 110 may determine an input at a device, such as the user device 110 or another device, such as a smartphone. For example, while the user device 110 is streaming audio or other content, a user may utter a voice input 140. The user device 110 may detect or determine the voice input 140 using one or more microphones. The voice input 140 may be a speech input or voice command to "turn on all of the lights." The user device 110 may send audio data representative of the voice input 140 to one or more remote servers to determine a meaning of the voice input 140. In some embodiments, a wake word, such as Alexa, may precede the voice input 140 and may be detected locally at the user device 110.

At a second block 184, the user device 110 and/or remote server may broadcast a control message to the Bluetooth Low Energy group. For example, the user device 110 may determine, using the voice input 140, a message to publish to the Bluetooth Low Energy mesh group. The message may include a request for lightbulbs in the group to turn to an "on" state. The Bluetooth Low Energy mesh group may include a first lightbulb node 160, a second lightbulb node 162, a third lightbulb node 164, and a fourth lightbulb node 166. The user device 110 may broadcast the control message as a multicast message 150 which may be in the form of an advertisement or beacon. The lightbulb nodes may receive the broadcast message and may implement the requested action. The lightbulb nodes may send a response message after receipt and/or after performing the requested action. However, the lightbulb nodes may direct the response message to the user device 110 via a proxy node. For example, the first lightbulb node 160 may be a first lightbulb proxy node. The remaining nodes may be in communication range of the first lightbulb proxy node, and the first lightbulb node 160 may therefore be able to communicate with each of the other lightbulb nodes using Bluetooth Low Energy.

At a third block 186, the user device 110 and/or remote sever may cause the proxy node to receive response messages from nodes in the Bluetooth Low Energy group. For example, the user device 110 may configure the Bluetooth Low Energy mesh network such that the first lightbulb node 160 is the proxy node. Accordingly, the second lightbulb node 162 may send its response message 170 to the first lightbulb node 160, the third lightbulb node 164 may send its response message 172 to the first lightbulb node 160, and the fourth lightbulb node 166 may send its response message 174 to the first lightbulb node 160.

At a fourth block 188, the user device 110 and/or remote sever may receive response messages from the proxy node. For example, the user device 110 may receive communications from the first lightbulb proxy node over a Bluetooth Low Energy connection 176. The first lightbulb node 160 may retransmit or relay response messages upon receipt and/or during connections to the user device 110. For example, the user device 110 may establish a connection to the first lightbulb proxy node 160, and may receive, from the first lightbulb proxy node, a first acknowledgment message indicating that the first lightbulb proxy node is turned on, and may also receive, from the first lightbulb proxy node, a second acknowledgment message indicating that the third lightbulb node is turned on, and so forth. As a result, the user device 110 may receive all of the response messages, without having to scan for Bluetooth Low Energy packets for 90% of the time.

The user device 110 may therefore act as an advertising bearer, and the first lightbulb proxy node may act as a generic attribute profile bearer that is configured to retransmit messages to the device. Advertising bearers may make use of Bluetooth advertising and scanning to receive messages and broadcast messages from/to other nodes. Generic attribute profile bearers may allow a device which does not support the advertising bearer to communicate indirectly with nodes of a mesh network which do, using a protocol known as the proxy protocol. A node which is able to relay mesh messages between nodes which use the advertising bearer and nodes which use the generic attribute profile bearer is known as a proxy node.

Accordingly, the user device 110 may receive audio data from the remote server 120 over a WiFi connection using the antenna during a duration, and may send the audio data to the speaker device 130 over a Bluetooth connection using the antenna during the duration, where the duration may be 60 milliseconds, for example. The message may be broadcasted during the same duration. Response messages may be received after the duration.

Example embodiments of the disclosure provide a number of technical features or technical effects. For example, in accordance with example embodiments of the disclosure, certain embodiments of the disclosure may use proxy nodes to receive data instead of scanning for data at a particular device, and may also broadcast messages to nodes in a network. As a result of improved functionality, latency in action implementation by nodes may be reduced, and device functionality may be increased due to avoidance of scanning time limitations. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
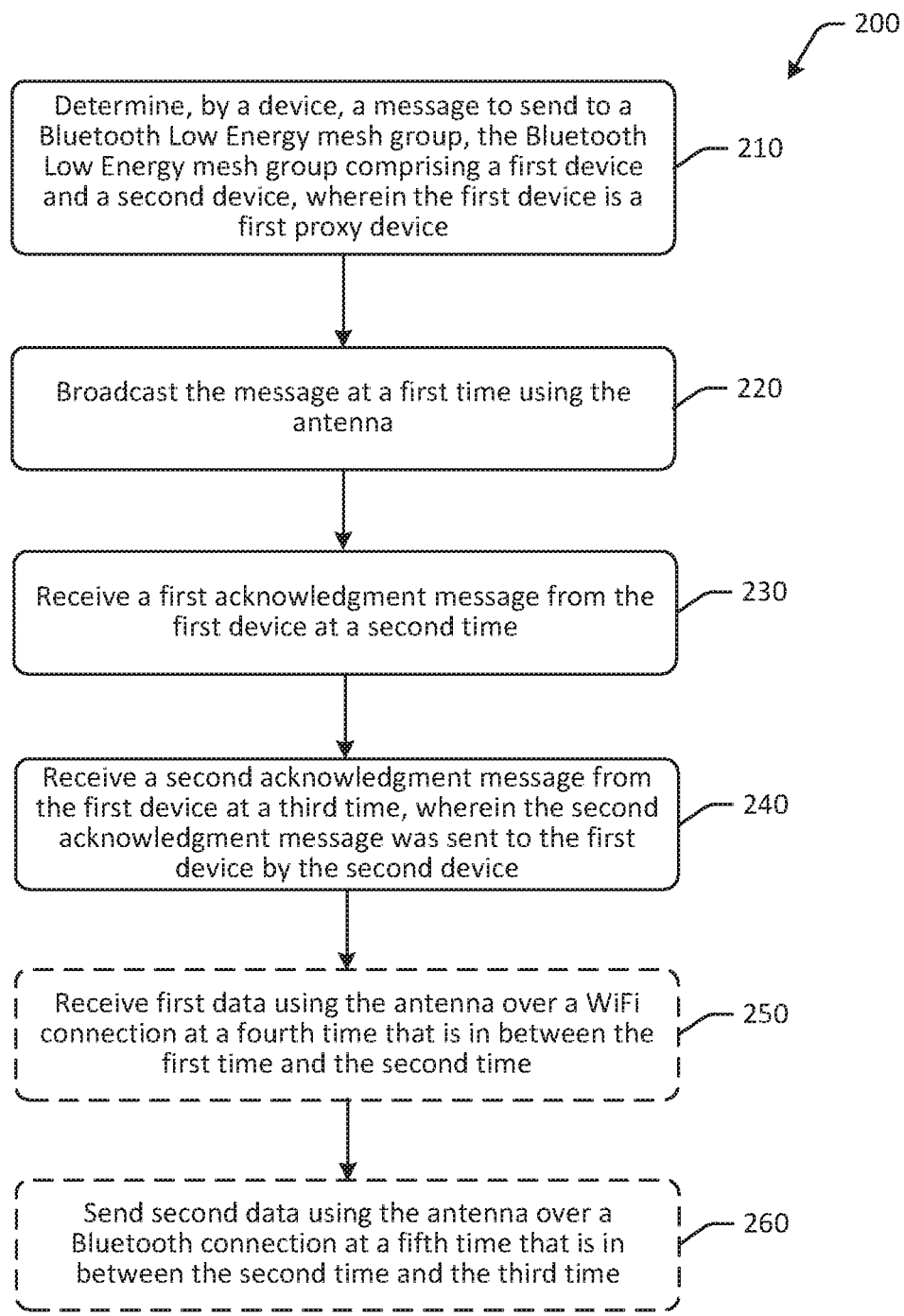
FIG. 2 is a schematic illustration of an example process flow for hybrid Bluetooth Low Energy mesh networks in accordance with one or more example embodiments of the disclosure.

FIG. 2 is a schematic illustration of an example process flow 200 for hybrid Bluetooth Low Energy mesh networks in accordance with one or more example embodiments of the disclosure. While example embodiments of the disclosure may be described in the context of Bluetooth Low Energy mesh networks and lightbulbs, it should be appreciated that the disclosure is more broadly applicable to any type of mesh network and/or connected devices, such as IoT devices. Some or all of the blocks of the process flows in this disclosure may be performed in a distributed manner across any number of devices. Some of the data flow or operations may be optional and may be performed in a different order.

At block 210 of the process flow 200, computer-executable instructions stored on a memory of a device, such as a user device, may be executed to determine a message to send to a Bluetooth Low Energy mesh group, the Bluetooth Low Energy mesh group comprising a first device and a second device, wherein the first device is a first proxy device. For example, one or more communication modules at a user device may be executed to determine a message to send to a Bluetooth Low Energy mesh group. The message may be a command message that causes nodes to implement a certain action, such as turning a light on, changing a thermostat temperature, unlocking a lock, and/or other actions that may be implemented by smart devices. In some embodiments, the user device may be a displayless voice-controlled device, and the antenna may be configured to transmit and/or receive data using one or more, or all, of a WiFi protocol, a Bluetooth protocol, and/or a Bluetooth Low Energy protocol. In some embodiments, the user device may include an antenna that is shared between both WiFi and Bluetooth communications. Accordingly, the user device may not have a separate Bluetooth Low Energy chip or radio in some embodiments. The message may be sent in the form of a beacon, an advertisement (e.g., an advertisement message, etc.), a broadcast message, or another form of one-to-many communication. The Bluetooth Low Energy mesh group may include any number of devices or nodes. For example, the Bluetooth Low Energy mesh group may include a set of device or node identifiers corresponding to a set of smart lightbulbs in a user's home. The set of lightbulbs may be nodes in a Bluetooth Low Energy mesh group for a "main floor" lightbulbs group, or an "upstairs" lightbulbs group, or another group. Groups may be used to control all of the devices in a group using a single device and/or broadcast message. Devices or nodes may belong to more than one group. For example, a node may be a member of both an "upstairs" group and a "master bedroom" group. The Bluetooth Low Energy mesh group may include a first device and a second device. The first device may be a first node in a Bluetooth Low Energy mesh network, and the second device may be a second node in the Bluetooth Low Energy mesh network. The first device may be a first proxy node or first proxy device. Accordingly, the first device may act as a proxy to one or more of the nodes, or the entire set of nodes in some instances, in the mesh network.

At block 220 of the process flow 200, computer-executable instructions stored on a memory of a device, such as the user device, may be executed to broadcast the message at a first time using the antenna. For example, one or more communication modules at a user device may be executed to broadcast the message at a first time using the antenna. To broadcast the message, the user device may publish the message to a Bluetooth Low Energy mesh group, or may otherwise send the message to a set of nodes in a Bluetooth Low Energy mesh network. In some embodiments, the message may be broadcasted as an advertisement by the user device. The user device may therefore act as an advertising bearer in the Bluetooth Low Energy mesh network. Nodes or devices that receive the broadcasted message may receive the message at substantially the same time. Nodes or devices that receive the broadcasted message may implement the requested action included in the broadcast. In some instances, the respective nodes may send an acknowledgment or confirmation message after receiving the broadcast and/or implementing the requested action. For example, if the message includes a command to turn on a lightbulb, the lightbulb may send an acknowledgment message or other confirmation that the lightbulb is in an "on" state. Such response data may be used to update a user interface, such as a user interface displaying which lights are on in a smart home environment, for example.

At block 230 of the process flow 200, computer-executable instructions stored on a memory of a device, such as the user device, may be executed to receive a first acknowledgment message from the first device at a second time. For example, one or more communication modules at a user device may be executed to receive a first acknowledgment message from the first device at a second time. The first acknowledgment message may indicate that the first device has completed a certain task and/or received the broadcast message. The user device may receive the first acknowledgment message at a second time that is later, or occurs after, the first time. For example, if the broadcast message is sent at time t=0, the first acknowledgment message may be received at time t=1.

At block 240 of the process flow 200, computer-executable instructions stored on a memory of a device, such as the user device, may be executed to receive a second acknowledgment message from the first device at a third time, wherein the second acknowledgment message is or was sent to the first device by the second device. For example, one or more communication modules at a user device may be executed to receive a second acknowledgment message from the first device at a third time, wherein the second acknowledgment message is or was sent to the first device by the second device. The first device may be a first proxy device. In some embodiments, the first device may be a generic attribute profile bearer that is configured to retransmit or relay messages from other nodes to the user device. For example, the first device may act as a proxy between the user device and the second device or second node. The first device may therefore receive messages from the second device intended for the user device, and may send, retransmit, or relay the messages from the second device to the user device. For example, the second device may receive the broadcast message sent by the user device, and may send an acknowledgment message. However, the acknowledgment message from the second device may not be sent directly to the user device. Instead, the acknowledgment message may be sent from the second device to the first device, which may act as the proxy. The first device may receive the acknowledgment message from the second device, and may send or forward the acknowledgment message from the second device to the user device. In some embodiments, the first device may relay the acknowledgment message from the second device upon receipt. In other embodiments, the first device may be configured to buffer messages intended for the user device. The first device may act as a generic attribute profile bearer that is configured to retransmit, send, or otherwise or relay messages from other nodes to the user device. The third time may occur after the second time in some instances.

In some embodiments, the user device may establish a connection with the first device before receiving the acknowledgment message from the second device. The connection may be a Bluetooth Low Energy connection. The connection between the user device and the first device may be in the form of a central device and peripheral device, where the user device is the central device, and the first device is the peripheral device. The connection may allow data to be sent from the user device to the first device, and/or from the first device to the user device. In some embodiments, two-way communication may be enabled over the connection. In instances where the user device establishes a connection with the first device, the user device may automatically disconnect from the first device after a certain length of time and/or after a certain amount or type of data is received.

At optional block 250 of the process flow 200, computer-executable instructions stored on a memory of a device, such as the user device, may be executed to receive first data using the antenna over a WiFi connection at a fourth time that is in between the first time and the second time. For example, the user device may be receiving audio data in order to stream music to a speaker device. The user device may therefore receive first data using the antenna over a WiFi connection during a time interval after the broadcast message is sent and the first acknowledgment message is received from the first device. Accordingly, the user device may be using the antenna for more than one communication protocol during broadcast and/or receipt of message from nodes in a Bluetooth Low Energy mesh network.

At optional block 260 of the process flow 200, computer-executable instructions stored on a memory of a device, such as the user device, may be executed to send second data using the antenna over a Bluetooth connection at a fifth time that is in between the second time and the third time. For example, the user device may be sending audio data to a speaker device for playback over a Bluetooth Classic connection. The user device may therefore send second data using the antenna over a Bluetooth connection during a time interval after first acknowledgment message is received and the second acknowledgment message is received. In some embodiments, the user device may receive audio data using the antenna over a WiFi connection during a first duration, and may send the audio data to a speaker device using the antenna over a Bluetooth connection during a second duration. The first time, the second time, and the third time may occur during the second duration. Accordingly, the user device may be using the antenna for more than one communication protocol during broadcast and/or receipt of message from nodes in a Bluetooth Low Energy mesh network.

As a result of the process flow 200, the user device may receive messages from one or more, or all, of the nodes in the Bluetooth Low Energy mesh network or group via a proxy device, and the user device may therefore not have to scan or be in a receiving mode for any certain length of time, such as 90% of the time. Accordingly, the user device may be configured to use a shared antenna for other communications at the same time data is sent to or received from nodes in a Bluetooth Low Energy mesh network. Because the first device is a proxy device, the first device may receive messages on behalf of the user device, and may relay the messages to the user device during appropriate times, thereby ensuring that messages are received by the user device and are not lost or not received. In addition, the user device may not have to be in a scanning or receiving mode for 90% of the time, for example. The user device may therefore comply with certain standard or specification requirements for mesh networks while providing additional functionality that may not otherwise be available without additional hardware.

Figure 3:
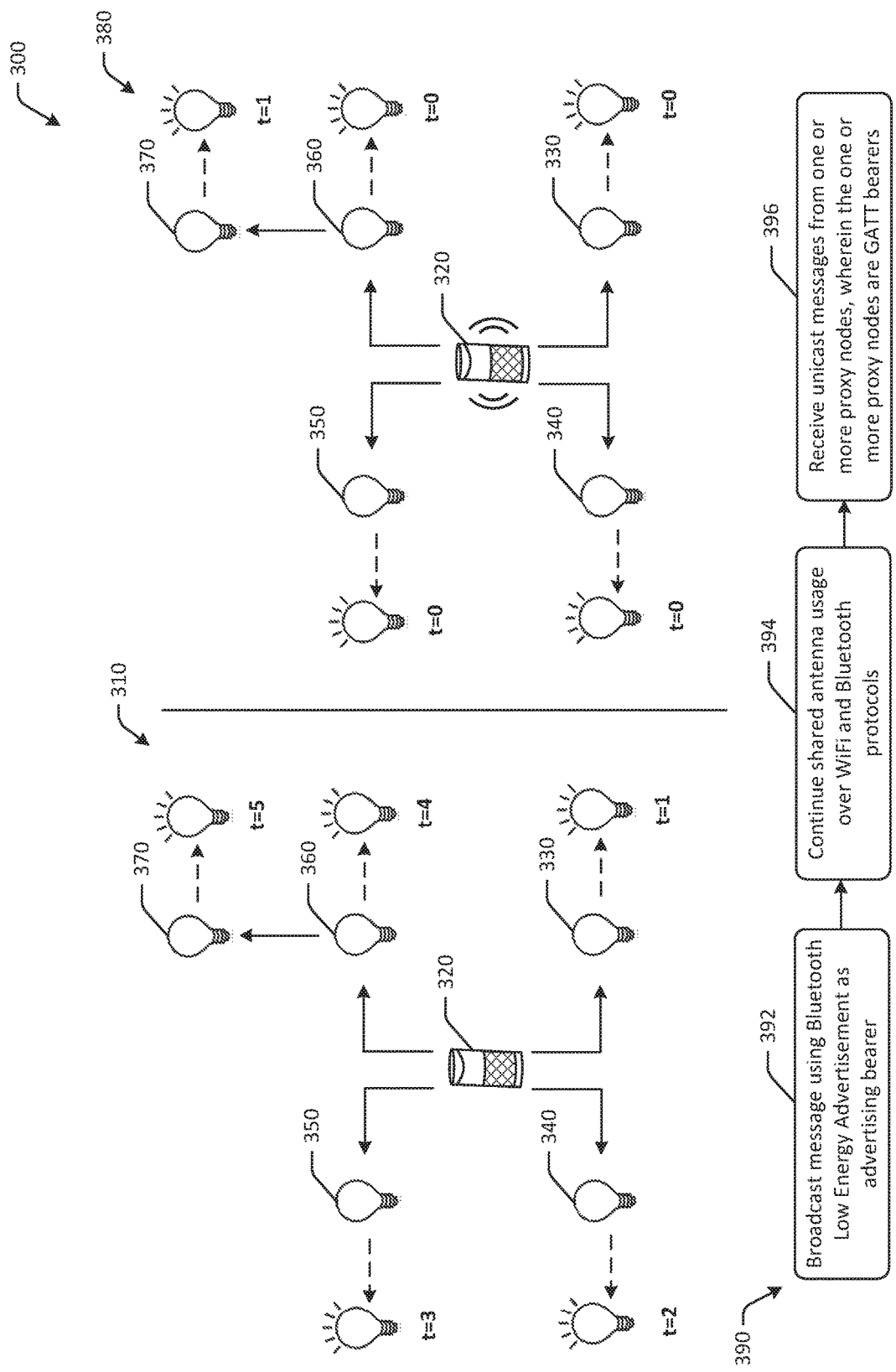
FIG. 3 is a schematic illustration of a Bluetooth Low Energy mesh network with and without proxy devices, and an operation flow for hybrid Bluetooth Low Energy mesh networks in accordance with one or more example embodiments of the disclosure.

FIG. 3 is a schematic illustration 300 of a Bluetooth Low Energy mesh network with and without proxy devices, and an operation flow for hybrid Bluetooth Low Energy mesh networks in accordance with one or more example embodiments of the disclosure. While example embodiments of the disclosure may be described in the context of Bluetooth Low Energy mesh networks and lightbulbs, it should be appreciated that the disclosure is more broadly applicable to any type of mesh network and/or connected devices, such as IoT devices. Some or all of the blocks of the process flows in this disclosure may be performed in a distributed manner across any number of devices. Some of the data flow or operations may be optional and may be performed in a different order.

In FIG. 3, a first network configuration 310 may include a user device 320 and a set of devices in a network, such as lightbulb devices, sensor devices, IoT devices, or other devices. The user device 320 may be a device with an antenna that is shared for various types of communication, such as WiFi communication and Bluetooth communication. The user device 320 may include coexistence protocols for the shared use of the antenna. The set of devices in the first network configuration 310 may include a first device 330, a second device 340, a third device 350, a fourth device 360, and a fifth device 370. The fourth device 360 may act as a proxy between the user device 320 and the fifth device 370. For example, the fifth device 370 may be out of range for direct communication with the user device 320. The user device 320 may be configured to control the set of devices. For example, the user device 320 may be configured to send commands to the respective devices to turn on, turn off, change color, and so forth. In other embodiments, the user device 320 may be configured to send additional, fewer, and/or different commands to the respective devices.

In the illustrated example, the user device 320 may send a command message to the respective devices to turn to an "on" state (e.g., the lightbulbs may turn on in response to the command message, etc.). The first network configuration 310 may be a Bluetooth Low Energy mesh network. However, the first network configuration 310 may not include the hybrid Bluetooth Low Energy mesh network having proxy devices as described herein. Therefore, the user device 320 may individually connect to the respective devices, send the command message, and then connect to a different device. For example, the user device 320 may first connect to the first device 330 and send the command message. As a result, the first device 330 may turn on at time t=1. The user device 320 may then connect to the second device 340 and send the command message. As a result, the second device 340 may turn on at time t=2, which may be milliseconds or seconds after t=1. The user device 320 may then connect to the third device 350 and send the command message. As a result, the third device 350 may turn on at time t=3, which may be milliseconds or seconds after t=2. The user device 320 may then connect to the fourth device 360 and send the command message. As a result, the fourth device 360 may turn on at time t=4, which may be milliseconds or seconds after t=3. The fourth device 360 may also relay or retransmit the command message from the user device 320 to the fifth device 370. The relay may cause a slight delay in the fifth device 370 receiving the command message. As a result, the fifth device 370 may turn on at time t=5, which may be milliseconds or seconds after t=4. The user device 320 may remain connected to the respective devices until an acknowledgment or confirmation message is received, so as to ensure the action was implemented by the device.

The first network configuration 310 may result in a popcorn effect. A popcorn effect may occur when devices that are supposed to implement an action at substantially the same time (e.g., all of the lightbulbs are to turn on at the same time, etc.), actually implement the action at different times or with latency. The latency or delay with which the action is implemented may be visually discernable by users. For example, a user may see that the fifth device 370 turned on at a later time than any of the first device 330 through fourth device 360. The user experience may therefore not be optimal.

FIG. 3 depicts a second network configuration 380. The second network configuration 380 may be a hybrid Bluetooth Low Energy mesh network as described herein. The second network configuration 380 may include the user device 320, the first device 330, the second device 340, the third device 350, the fourth device 360, and the fifth device 370. The first device 330 may be a first node in the mesh network, the second device 340 may be a second node in the mesh network, the third device 350 may be a third node in the mesh network, the fourth device 360 may be a fourth node in the mesh network, and the fifth device 370 may be a fifth node in the mesh network.

In contrast to the first network configuration 310, during operation, the user device 320 may broadcast the command message to all of the devices in the mesh network. For example, the user device 320 may broadcast the command message as an advertisement or a beacon to all of the first device 330, the second device 340, the third device 350, the fourth device 360, and/or other devices in the mesh network or group. Accordingly, the respective devices may receive the broadcast at substantially the same time. The respective devices may therefore implement the action requested by the command message at substantially the same time, such as t=0. For example, the first device 330, the second device 340, the third device 350, and the fourth device 360 may turn on at the same time at t=0.

The fifth device 370 may be out of range of direct communication with the user device 320 and/or may not receive the broadcast message, and may therefore rely on a relay from a proxy, such as the fourth device 360. Accordingly, the fifth device 370 may turn on at t=1, which may be milliseconds or seconds after t=0. However, the remaining devices may turn on at substantially the same time.

The second network configuration 380 may therefore avoid the popcorn effect, and may improve the user experience by reducing latency associated with actions that are to be implemented by devices. Users may therefore not visually discern the difference in time in implementation of actions by the respective devices. Although the fifth device 370 may be slightly delayed, the majority of the devices may be within beacon range of the user device 320 (e.g., able to receive the beacon from the user device 320, etc.), and the majority of latency may therefore be eliminated.

Because the user device 320 may not have to connect to individual devices or proxy nodes, the user device 320 may not have to wait for individual response (e.g., confirmation, acknowledgment, etc.) messages from each of the nodes in the mesh network. However, the response messages may still be needed, for example, to update control panels, user interfaces, device states, and so forth. In addition, the user device 320 may be used for other operations at the time the response messages are to be received, such as streaming content, sending content to speaker or other devices, and so forth. The user device 320 may therefore utilize one or more proxy nodes to relay response messages from other nodes with which the proxy node is in communication. The user device 320 may therefore connect to the proxy node and receive response messages. The proxy node may act as a receiver and/or relay of response messages for the user device 320. As a result, the user device 320 may not miss any response messages as a result of unavailable antenna usage.

To implement the hybrid Bluetooth Low Energy mesh network of the second configuration 380, a process flow 390 may be implemented by the user device 320. For example, one or more computer processors at the user device 320 or a remote server may execute computer-executable instructions to, at block 392, broadcast a message using a Bluetooth Low Energy Advertisement, where the user device 320 is an advertising bearer. At block 394, the user device 320 may continue shared antenna usage over WiFi and Bluetooth protocols. At block 396, the user device 320 may receive unicast messages from one or more proxy nodes, wherein the one or more proxy nodes are generic attribute profile bearers.

Figure 4:
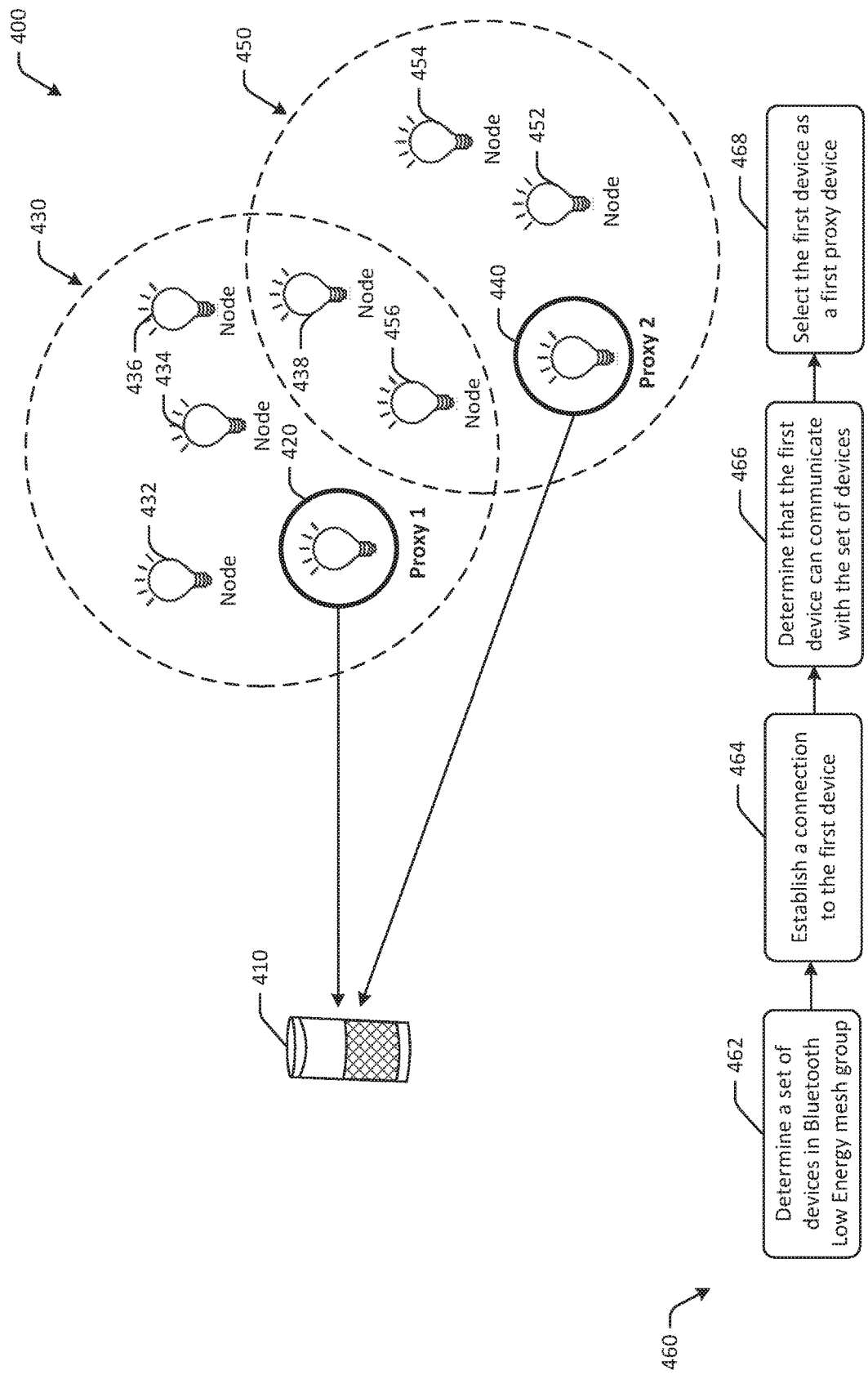
FIG. 4 is a hybrid schematic illustration of an example use case and process flow for hybrid Bluetooth Low Energy mesh networks in accordance with one or more example embodiments of the disclosure.

FIG. 4 is a hybrid schematic illustration of an example use case 400 and process flow for hybrid Bluetooth Low Energy mesh networks in accordance with one or more example embodiments of the disclosure. While example embodiments of the disclosure may be described in the context of Bluetooth Low Energy mesh networks and lightbulbs, it should be appreciated that the disclosure is more broadly applicable to any type of mesh network and/or connected devices, such as IoT devices. Some or all of the blocks of the process flows in this disclosure may be performed in a distributed manner across any number of devices. Some of the data flow or operations may be optional and may be performed in a different order.

In FIG. 4, a user device 410 may be part of a hybrid Bluetooth Low Energy mesh network. The hybrid Bluetooth Low Energy mesh network may include a set of devices, such as lightbulb devices, sensor devices, IoT devices, or other devices. The user device 410 may be a device with an antenna that is shared for various types of communication, such as WiFi communication and Bluetooth communication. The user device 410 may include coexistence protocols for the shared use of the antenna. The user device 410 may be used to communicate with the set of devices in the mesh network.

The set of devices or set of nodes in the Bluetooth Low Energy mesh network may include nodes that cannot be reached by a single proxy. For example, the set of devices may include a first node 420, a second node 432, a third node 434, a fourth node 436, a fifth node 438, a sixth node 456, a seventh node 440, an eighth node 452, a ninth node 454, and so forth. Any number of nodes may be included. Some of the nodes may be out of beacon range of the user device 410, and may therefore not receive beacons or messages directly from the user device 410.

Accordingly, the user device 410 may use one or more proxies to communicate with the complete set of devices or nodes in the mesh network. To determine which device or node to use as a proxy, the user device 410 or a remote server may implement a process flow 460. In some embodiments, such as that illustrated in the example of FIG. 4, the user device 410 may be configured to determine how many proxy nodes are needed to communicate with all of the devices in a group, and may optimally select nodes to designate as proxies.

At block 462 of the process flow 460, the user device 410 may determine a set of devices in a Bluetooth Low Energy mesh group. For example, the user device 410 may determine node identifiers or device identifiers of each of the nodes subscribed to a particular Bluetooth Low Energy mesh group. The user device 410 may determine whether each of the nodes in the Bluetooth Low Energy mesh group can be reached directly by the user device 410. For example, the user device 410 may broadcast or send a "get status" message or other query to the devices within range of the user device 410. If responses are not received directly from the respective devices by the user device 410, the user device 410 may determine that not all nodes are within beacon range of the user device 410. To determine whether responses are received directly, the user device 410 may determine whether a time-to-live value associated with a response message has been decremented. If so, the associated node may not be within beacon range of the user device 410. In the example of FIG. 4, the user device 410 may determine that not all of the devices in the Bluetooth Low Energy mesh group are within beacon range. The user device 410 may therefore determine that one or more proxy nodes are to be used for communication with the Bluetooth Low Energy mesh group.

At block 464 of the process flow 460, the user device 410 may establish a connection to a first device. The first device may be the first node 420. The connection may be a Bluetooth Low Energy connection.

At block 466 of the process flow 460, the user device 410 may determine that the first device can communicate with the set of devices. For example, the user device 410 may determine that the first node 420 can communicate with the set of nodes in the Bluetooth Low Energy mesh group. In the example of FIG. 4, the Bluetooth Low Energy mesh group may be an "outdoor lights" Bluetooth Low Energy mesh group that controls lights outside a home. The "outdoor lights" Bluetooth Low Energy mesh group may include the first node 420, the second node 432, the third node 434, the fourth node 436, the fifth node 438, the sixth node 456. The first node 420 may have a communication range 430 in which the first node 420 can communicate with other devices or nodes using a Bluetooth Low Energy connection. The communication range 430 may depend on hardware used by the first node 420, placement, obstacles or interference, and so forth. As illustrated in FIG. 4, the first node 420, the second node 432, the third node 434, the fourth node 436, the fifth node 438, the sixth node 456 may be within the communication range 430.

To determine that the first device or first node 420 can communicate with the set of devices or nodes in the Bluetooth Low Energy mesh group, the user device 410 may receive a set of heartbeat messages from the first node 420, and may determine that the set of heartbeat messages corresponds to the set of devices. For example, heartbeat messages may be received from each of the nodes in the Bluetooth Low Energy mesh group via the first node 420. The user device 410 may remain connected to the first node 420 for a certain length of time to determine whether all heartbeat messages from the first node 420 have been received. In other embodiments, instead of heartbeat messages, a "get status" query may be used.

Heartbeat messages may be messages that are transmitted by nodes periodically. A heartbeat message may indicate to other nodes in the network that the node sending the heartbeat is still active. In addition, heartbeat messages may include data which allows receiving nodes to determine how far away the sender is, in terms of the number of hops (e.g., network hops, etc.) required to reach it, such as via a time-to-live value.

At block 468 of the process flow 460, the user device 410 may select or otherwise use the first device as a first proxy device. For example, the user device 410 may determine that, because the first node 420 can communicate with all of the nodes in the Bluetooth Low Energy mesh group, the first node 420 is to be selected or used as a first proxy device. The first node 420 may therefore be used to receive messages from the other nodes in the Bluetooth Low Energy mesh group, and to send the messages to the user device 410, instead of the user device 410 receiving messages directly from the other nodes. In some instances, if more than one node can act as a proxy to an entire network, the user device 410 may determine which such node can communicate with the least number of hops, and that node may be selected or used as the proxy.

In some embodiments, a single proxy may not be able to communicate with all of the nodes in the Bluetooth Low Energy mesh group. For example, in FIG. 4, if the Bluetooth Low Energy mesh group includes each of the first node 420, the second node 432, the third node 434, the fourth node 436, the fifth node 438, the sixth node 456, the seventh node 440, the eighth node 452, and the ninth node 454, not all of the nodes may be within the communication range 430 of the first node 420.

Accordingly, the user device 410 may only receive heartbeat messages from some of the nodes via the first node 420. In such instances, the user device 410 may determine a second proxy node to use in addition to the first proxy. For example, the user device 410 may establish a connection to the seventh node 440, and may determine which nodes are within a communication range 450 of the seventh node 440. The user device 410 may use heartbeat messages received from the seventh node 440 to determine which nodes are within the communication range 450. If the seventh node 440 is within communication range of the nodes that the first node 420 cannot communicate with, the user device 410 may select the seventh node 440 as a second proxy node. In some instances, if more than one node can act as a proxy to the nodes that are out of range of the first proxy node, the user device 410 may determine which such node can communicate with the least number of hops, and that node may be selected as the proxy.

In instances where more than one proxy node is used, to determine which proxies are used for communication with which nodes, the user device 410 may determine a number of hops needed for the nodes within range of more than one proxy. For example, in FIG. 4, the fifth node 438 and the sixth node 456 may be within range of both the first proxy node 420 and the second proxy node 440. Based at least in part on the number of hops needed for the fifth node 438 and the sixth node 456 to reach the first proxy node 420 and the second proxy node 440, respectively, the user device 410 may assign nodes to the respective proxy nodes accordingly. As a result, communication latency may be reduced and network performance may be optimized.

Figure 5:
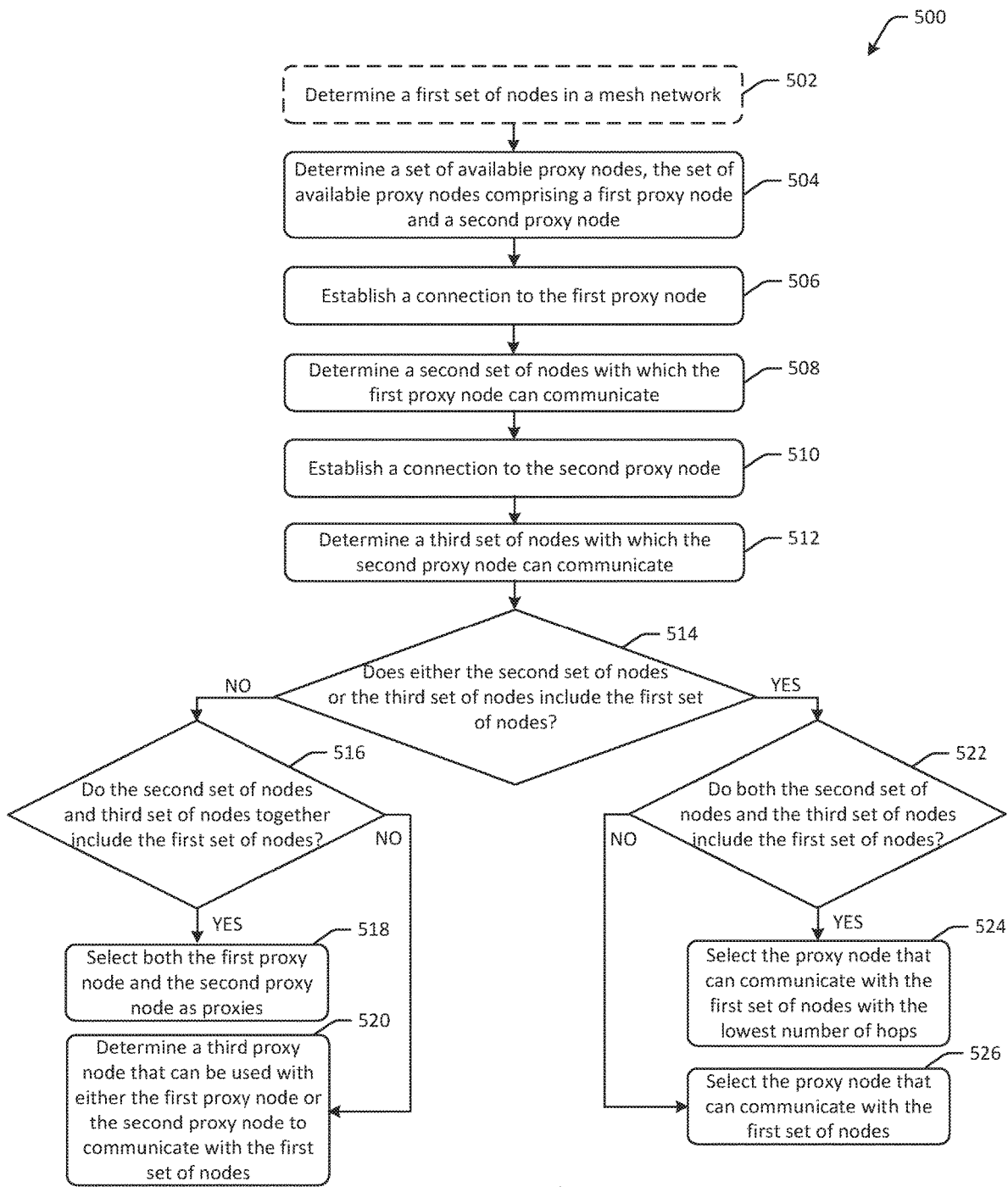
FIG. 5 is a schematic illustration of an example process flow for proxy node selection for hybrid Bluetooth Low Energy mesh networks in accordance with one or more example embodiments of the disclosure.

FIG. 5 is a schematic illustration of an example process flow 500 for proxy node selection for hybrid Bluetooth Low Energy mesh networks in accordance with one or more example embodiments of the disclosure. While example embodiments of the disclosure may be described in the context of Bluetooth Low Energy mesh networks and lightbulbs, it should be appreciated that the disclosure is more broadly applicable to any type of mesh network and/or connected devices, such as IoT devices. Some or all of the blocks of the process flows in this disclosure may be performed in a distributed manner across any number of devices. Some of the data flow or operations may be optional and may be performed in a different order. The process flow 600 may be executed periodically, upon detecting a change in network configuration or membership, on demand, and so forth.

At optional block 502 of the process flow 500, computer-executable instructions stored on a memory of a device, such as a user device or remote server, may be executed to determine a first set of nodes in a mesh network. For example, a user device may be configured to determine a first set of devices or nodes in a Bluetooth Low Energy mesh network. The user device may determine the first set of nodes by determining node or device identifiers subscribed to a particular group or otherwise associated with the mesh network.

At block 504, computer-executable instructions stored on a memory of a device, such as a user device or remote server, may be executed to determine a set of available proxy nodes, the set of available proxy nodes comprising a first proxy node and a second proxy node. For example, the user device may identify a list of proxy node nears a mesh gateway or controller. In some embodiments, devices or nodes within beacon range or direct communication range of the user device may be available proxy nodes.

At block 506, computer-executable instructions stored on a memory of a device, such as a user device or remote server, may be executed to establish a connection to the first proxy node. For example, the user device may connect to any one, or each, of the set of available proxy nodes. The user device may remain connected to the respective proxy node and wait for heartbeat messages. The duration of the connection may be based at least in part on network density, to ensure that all heartbeats are received from nodes that are in communication with the proxy node.

At block 508, computer-executable instructions stored on a memory of a device, such as a user device or remote server, may be executed to determine a second set of nodes with which the first proxy node can communicate. For example, the user device may, after connecting to the first proxy node, determine a list or set of nodes that are reachable through the first proxy node. The user device may set an affinity value for the first proxy node based at least in part on the number of nodes reachable by the first proxy node.

At block 510, computer-executable instructions stored on a memory of a device, such as a user device or remote server, may be executed to establish a connection to the second proxy node. For example, the user device may connect to any one, or each, of the set of available proxy nodes. The user device may remain connected to the respective proxy node and wait for heartbeat messages. The duration of the connection may be based at least in part on network density, to ensure that all heartbeats are received from nodes that are in communication with the proxy node.

At block 512, computer-executable instructions stored on a memory of a device, such as a user device or remote server, may be executed to determine a third set of nodes with which the second proxy node can communicate. For example, the user device may, after connecting to the second proxy node, determine a list or set of nodes that are reachable through the second proxy node. The user device may set an affinity value for the second proxy node based at least in part on the number of nodes reachable by the second proxy node. If both the first proxy node and the second proxy node receive heartbeats from the same nodes, the proxy that received the heartbeat with the lowest decremented time-to-live or least number of hops is assigned to the node.

At determination block 514, computer-executable instructions stored on a memory of a device, such as a user device or remote server, may be executed to make a determination as to whether either the second set of nodes or the third set of nodes includes the first set of nodes. For example, the user device may determine whether the second set of nodes reachable by the first proxy node includes all of the nodes in the first set of nodes, or covers all of the nodes in the Bluetooth Low Energy mesh network. The user device may determine whether the third set of nodes reachable by the second proxy node includes all of the nodes in the first set of nodes, or covers all of the nodes in the Bluetooth Low Energy mesh network.

If it is determined at determination block 514 that neither the second set of nodes nor the third set of nodes includes the first set of nodes, the process flow 500 may proceed to determination block 516. At determination block 514, computer-executable instructions stored on a memory of a device, such as a user device or remote server, may be executed to make a determination as to whether the second set of nodes and the third set of nodes together include the first set of nodes. For example, the user device may determine whether the second set of nodes and the third set of nodes combined include all of the nodes in the first set of nodes, or includes all of the nodes in the Bluetooth Low Energy mesh network.

If it is determined at determination block 516 that the second set of nodes and the third set of nodes combined include all of the nodes in the first set of nodes, the process flow 500 may proceed to block 518, at which both the first proxy node and the second proxy node are selected or used as proxies for the Bluetooth Low Energy mesh network. For example, the user device may select or use both the first proxy node and the second proxy node as proxies for the Bluetooth Low Energy mesh network.

If it is determined at determination block 516 that the second set of nodes and the third set of nodes combined do not include all of the nodes in the first set of nodes, the process flow 500 may proceed to block 520, at which a third proxy node that can be used with either the first proxy node or the second proxy node to communicate with the first set of nodes may be determined. For example, the user device may continue searching for a third proxy node that can be used in conjunction with either or both the first proxy node and/or the second proxy node to communicate with each of the first set of nodes, such that the entire Bluetooth Low Energy mesh network is covered.

The user device may connect to any required numbers of proxy nodes so as to cover the entire network. To determine how many proxy nodes are needed, the user device may determine that the first proxy node can communicate with a first subset of the set of devices or nodes in the Bluetooth Low Energy mesh network, and may determine that the second proxy node can communicate with a second subset of the set of devices or nodes in the Bluetooth Low Energy mesh network. If the first subset and the second subset together include the complete set of devices or nodes in the Bluetooth Low Energy mesh network, no further proxy nodes may be needed. If not, the user device may continue searching for additional proxy nodes.

If it is determined at determination block 514 that either the second set of nodes or the third set of nodes includes the first set of nodes, the process flow 500 may proceed to determination block 522. At determination block 522, computer-executable instructions stored on a memory of a device, such as a user device or remote server, may be executed to make a determination as to whether both the second set of nodes and the third set of nodes include the first set of nodes. For example, the user device may determine whether both the second set of nodes and the third set of nodes individually include all of the nodes in the first set of nodes, or includes all of the nodes in the Bluetooth Low Energy mesh network. If determined to be positive, it may indicate that both the first proxy node and the second proxy node can be used to communicate with the entire network.

If it is determined at determination block 522 that both the second set of nodes and the third set of nodes individually include all of the nodes in the first set of nodes, the process flow 500 may proceed to block 524, at which the proxy node that can communicate with the first set of nodes with the lowest number of hops may be selected as the proxy for the Bluetooth Low Energy mesh network. For example, the user device may select the proxy node that can communicate with the first set of nodes with the lowest number of hops as the proxy for the Bluetooth Low Energy mesh network.

To determine which proxy node has the lowest number of hops, the user device may determine a first number of hops used by the first device or first proxy node to communicate with the set of devices, and may determine a second number of hops used by the second device or second proxy node to communicate with the set of devices. The user device may determine which number of hops is lower or least decremented (e.g., that the first number of hops is less than the second number of hops, etc.).

If it is determined at determination block 522 that both the second set of nodes and the third set of nodes do not individually include all of the nodes in the first set of nodes, the process flow 500 may proceed to block 526, at which the proxy node that can communicate with the first set of nodes may be selected as the proxy for the Bluetooth Low Energy mesh network. For example, the user device may select the proxy node that can communicate with the first set of nodes, or all of the nodes in the Bluetooth Low Energy mesh network, instead of the proxy that cannot.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
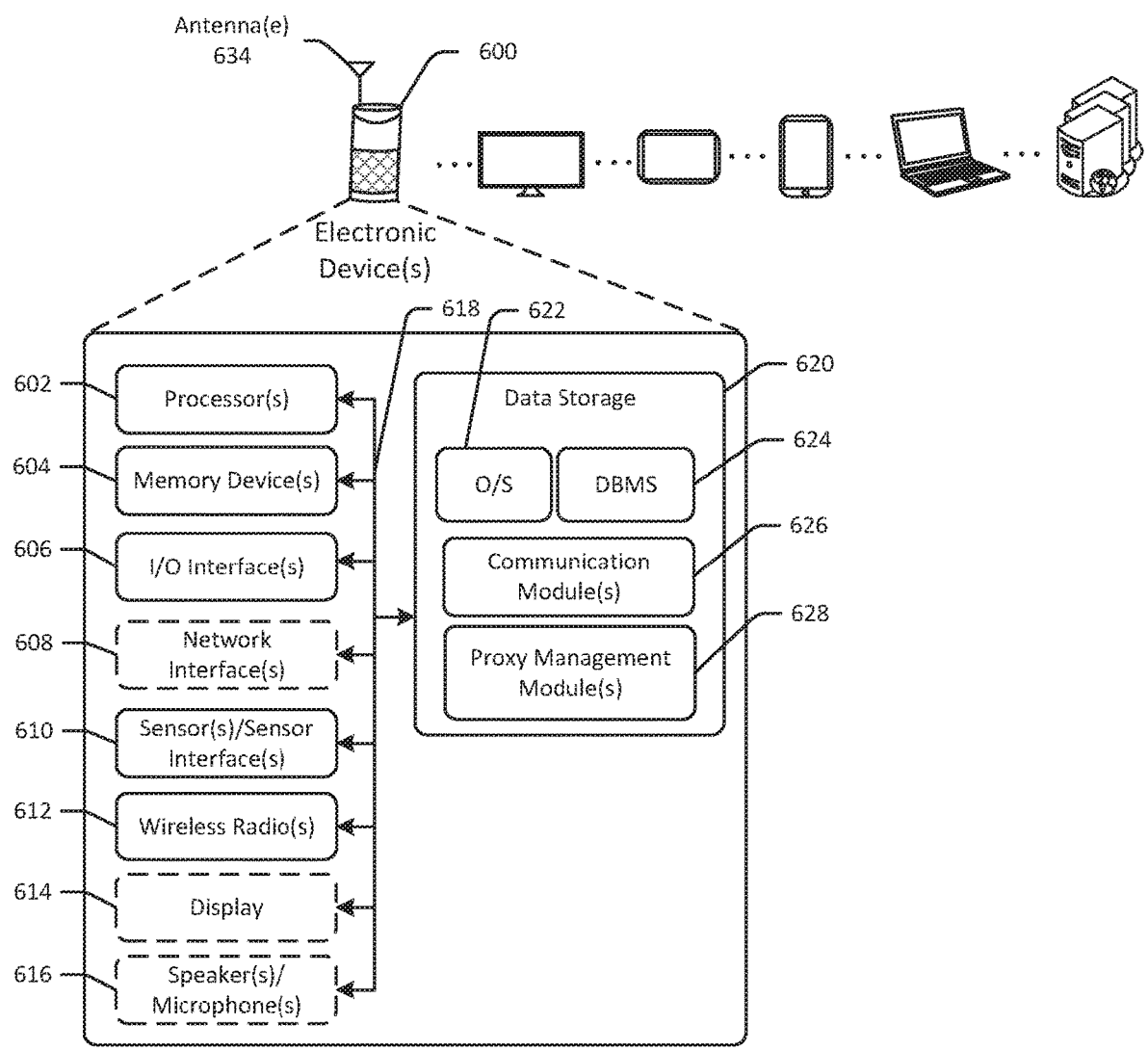
FIG. 6 is a schematic block diagram of an illustrative device in accordance with one or more example embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a voice interaction device, a displayless device, a mobile device such as a smartphone, a tablet, an e-reader, a wearable device, or the like; a desktop computer; a laptop computer; a content streaming device; or the like. The electronic device(s) 600 may correspond to an illustrative device configuration for the user device(s) of FIGS. 1-5.

The electronic device(s) 600 may be configured to communicate with one or more servers, user devices, or the like. The electronic device(s) 600 may be an offline computer system or an online computer system. In some instances, the electronic device(s) 600 may be a voice assistant device configured to stream content, determine speech input or voice commands, initiate actions at local or remote devices, and so forth.

The electronic device(s) 600 may optionally be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. In some embodiments, the electronic device(s) 600 may be configured to communicate using a Bluetooth and/or Bluetooth Low Energy connection, or another suitable personal area network, a WiFi network, or other networks.

In an illustrative configuration, the electronic device(s) 600 may include one or more processors (processor(s)) 602, one or more memory devices 604 (also referred to herein as memory 604), one or more input/output (I/O) interface(s) 606, one or more optional network interface(s) 608, one or more sensor(s) or sensor interface(s) 610, one or more wireless radio(s) 612, one or more optional display(s) 614, one or more optional microphone(s) 616, and data storage 620. The electronic device(s) 600 may further include one or more bus(es) 618 that functionally couple various components of the electronic device(s) 600. The electronic device(s) 600 may further include one or more optional antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional one or more communication module(s) 626, and/or one or more proxy management module(s) 628. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 728 may include computer-executable instructions, code, or the like that responsive to execution by one or more of the processor(s) 602 may perform functions including, but not limited to, streaming content, communicating with one or more devices, for example, via wired or wireless communication, communicating with remote servers, communicating with remote datastores, sending or receiving notifications or commands/directives, sending broadcast messages to Bluetooth Low Energy mesh network groups, receiving data from proxy nodes, communicating with cache memory data, communicating with user devices, and the like.

The proxy management module(s) 628 may include computer-executable instructions, code, or the like that responsive to execution by one or more of the processor(s) 602 may perform functions including, but not limited to, determining available proxy nodes, determining nodes in a group, determining time-to-live or a number of hops associated with a message, selecting proxy nodes, determining a number of proxy nodes to use for a network, determining when to reset proxy node selection, resetting proxy node selection, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, Bluetooth Low Energy, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 634 may include any suitable type of antenna depending, for example, on the communications protocols used to transmit or receive signals via the antenna (e) 634. Non-limiting examples of suitable antennae may include directional antennae, non-directional antennae, dipole antennae, folded dipole antennae, patch antennae, multiple-input multiple-output (MIMO) antennae, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The wireless radio(s) 612 may include any suitable radio component(s) for—in cooperation with the antenna(e) 634—transmitting or receiving radio frequency (RF) signals in the bandwidth and/or channels corresponding to the communications protocols utilized by the electronic device(s) 600 to communicate with other devices. The wireless radio(s) 612 may include hardware, software, and/or firmware for modulating, transmitting, or receiving—potentially in cooperation with any of antenna(e) 634—communications signals according to any of the communications protocols discussed above including, but not limited to, one or more Bluetooth protocols, one or more Bluetooth Low Energy protocols, or another suitable personal area network protocol or standard. The wireless radio(s) 612 may further include hardware, firmware, or software for receiving GNSS signals. The wireless radio(s) 612 may include any known receiver and baseband suitable for communicating via the communications protocols utilized by the electronic device(s) 600. The wireless radio(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A voice-controlled device comprising:
a microphone;
a single antenna used for both WiFi and Bluetooth-based communications;
memory configured to store computer-executable instructions; and
at least one computer processor configured to access the memory and execute the computer-executable instructions to:
receive speech input using the microphone, wherein the speech input corresponds to a request to turn on all lightbulbs in a Bluetooth Low Energy mesh group;
determine, using the speech input, a message to publish to the Bluetooth Low Energy mesh group, the Bluetooth Low Energy mesh group comprising a first lightbulb that is a first proxy node, a second lightbulb that is a second proxy node, a third lightbulb that is a third node in communication range of the first lightbulb, and a fourth lightbulb that is a fourth node in communication range of the second lightbulb;
broadcast the message as a Bluetooth Low Energy advertisement message;
establish a first connection to the first lightbulb;
establish a second connection to the second lightbulb;
receive, from the first lightbulb, a first acknowledgment message indicating that the first lightbulb is turned on;
receive, from the first lightbulb, a second acknowledgment message indicating that the third lightbulb is turned on;
receive, from the second lightbulb, a third acknowledgment message indicating that the second lightbulb is turned on; and
receive, from the second lightbulb, a fourth acknowledgment message indicating that the fourth lightbulb is turned on.

2. The voice assistant device of claim 1, wherein the at least one processor is further configured to access the memory and execute the computer-executable instructions to:
receive audio data from a remote server over a WiFi connection using the single antenna during a duration; and
send the audio data to a speaker device over a Bluetooth connection using the single antenna during the duration;
wherein the message is broadcasted during the duration, and wherein at least one of the first acknowledgment message, the second acknowledgment message, the third acknowledgment message, or the fourth acknowledgment message is received after the duration.

3. The voice assistant device of claim 1, wherein the at least one processor is further configured to access the memory and execute the computer-executable instructions to:

establish a connection to the first lightbulb;
determine that the first lightbulb can communicate with the third lightbulb; and
select the first lightbulb to receive messages from the third lightbulb.

4. The voice assistant device of claim 1, wherein the Bluetooth Low Energy mesh group includes a first set of lightbulbs and a second set of lightbulbs and wherein the at least one processor is further configured to access the memory and execute the computer-executable instructions to:
establish a connection to the first lightbulb;
determine that the first lightbulb can communicate with the first set of lightbulbs, wherein the first set of lightbulbs includes the first lightbulb;
establish a connection to the second lightbulb;
determine that the second lightbulb can communicate with the second set of lightbulbs, wherein the second set of lightbulbs includes the second lightbulb and wherein the first set is different from the second set;
receive messages from the first set of lightbulbs via the first lightbulb; and
receive messages from the second set of lightbulbs via the second lightbulb.

5. A device comprising:
an antenna;
memory configured to store computer-executable instructions; and
at least one computer processor configured to access the memory and execute the computer-executable instructions to:
send a message, at a first time using the antenna, to a plurality of devices in a Bluetooth Low Energy (BLE) mesh group, the plurality of devices comprising a first device and a second device;
receive a first acknowledgment message from the first device at a second time;
receive a second acknowledgment message from the first device at a third time, wherein the second acknowledgment message is sent to the first device by the second device;
receive first data using the antenna over a WiFi connection at a fourth time that is in between the first time and the second time; and
send second data using the antenna over a Bluetooth connection at a fifth time that is in between the second time and the third time.

6. The device of claim 5, wherein the first data is received from a third device and the second data is received from a fourth device, and wherein the third device and the fourth device are not included in the BLE mesh group.

7. The device of claim 5, wherein the at least one processor is further configured to access the memory and execute the computer-executable instructions to:
establish a connection to the first device;
determine that the first device is communicatively coupled with a subset of devices in the plurality of devices; and
receive messages from the subset via the first device.

8. The device of claim 7, wherein the at least one processor is further configured to access the memory and execute the computer-executable instructions to:
determine a first number of network hops used by the first device to communicate with a third device in the subset of devices;
determine a second number of network hops used by the first device to communicate with a fourth device in the subset of devices;
establish a connection to the second device;
determine that the second device is communicatively coupled with the subset of devices;
determine a third number of network hops used by the second device to communicate with the third device;
determine a fourth number of network hops used by the second device to communicate with the fourth device; and
determine that a first sum of the first number of network hops and the second number of network hops is less than a second sum of the third number of network hops and the fourth number of network hops.

9. The device of claim 5, wherein the plurality of devices further comprises a third device, and wherein at least one processor is further configured to access the memory and execute the computer-executable instructions to:
establish a connection to the first device;
establish a connection to the third device;
determine that the first device can communicate with a first subset in the plurality of devices;
determine that the third device can communicate with a second subset in the plurality of devices, wherein the first subset is different from the second subset and they together include the plurality of devices;
receive messages from the first subset via the first device; and
receive messages from the second subset via the second device.

10. The device of claim 5, wherein the at least one processor is further configured to access the memory and execute the computer-executable instructions to:
receive audio data using the antenna over a WiFi connection during a first duration; and
send the audio data to a speaker device using the antenna over a Bluetooth connection during a second duration;
wherein the first time, the second time, and the third time occur during the second duration.

11. The device of claim 5, wherein the device further comprises a microphone, and wherein the at least one processor is further configured to access the memory and execute the computer-executable instructions to:
receive voice input;
send, to a remote server, first data corresponding to the voice input; and
receive, from the remote server, second data corresponding to the message, wherein the message is determined based at least in part on the voice input.

12. The device of claim 5, wherein the device is a voice-controlled device, and wherein the antenna is configured to transmit and receive data using a WiFi protocol, a Bluetooth protocol, and a BLE protocol.

13. A method comprising:
determining, by a device comprising one or more computer processors coupled to memory, a message to send to a plurality of devices in a Bluetooth Low Energy (BLE) mesh group, the plurality of devices comprising a first device and a second device, wherein the first device is a first proxy device;
sending the message as broadcast message at a first time using an antenna;

determining a first acknowledgment message from the first device at a second time;

determining a second acknowledgment message from the first device at a third time, wherein the second acknowledgment message is sent to the first device by the second device;

receiving audio data using the antenna over a WiFi connection during a first duration; and sending the audio data to a speaker device using the antenna over a Bluetooth connection during a second duration;

wherein the first time, the second time, and the third time occur during the second duration.

14. The method of claim 13, wherein the device is a voice-controlled device, and wherein the antenna is configured to transmit and receive data using a WiFi protocol, a Bluetooth protocol, and a BLE protocol.

15. The method of claim 13, wherein the device further comprises a microphone, the method further comprising:

receiving voice input;

sending, to a remote server, first data corresponding to the voice input; and receiving, from the remote server, second data corresponding to the message, wherein the message is determined based at least in part on the voice input.

16. The method of claim 13, further comprising:

receiving first data using the antenna over a WiFi connection at a fourth time that is in between the first time and the second time; and sending second data using the antenna over a Bluetooth connection at a fifth time that is in between the second time and the third time.

17. The method of claim 13, further comprising:

establishing a connection to the first device;

determining that the first device can communicate with a subset in the plurality of devices; and using the first device to communicate with the subset of devices.

18. The method of claim 17, further comprising:

determining a first number of network hops used by the first device to communicate with a third device in the subset of devices;

establishing a connection to the second device;

determining that the second device can communicate with the subset of devices;

determining a second number of network hops used by the second device to communicate with the third device; and determining that the first number of network hops is less than the second number of network hops.

19. The method of claim 13, further comprising:

establishing a connection to the first device;

establishing a connection to the third device;

determining that the first device can communicate with a first subset in the plurality of devices;

determining that the third device can communicate with a second subset in the plurality of devices, wherein the first subset is different from the second subset and they together include the plurality of devices;

receiving messages from the first subset via the first device; and receiving messages from the second subset via the second device.

\* \* \* \* \*